(12) United States Patent
Hamura et al.

(10) Patent No.: US 7,901,167 B2
(45) Date of Patent: Mar. 8, 2011

(54) MACHINING APPARATUS WITH MECHANISM FOR RETAINING AXIAL POSITION OF GUIDE MEMBER

(75) Inventors: Masayuki Hamura, Yamanashi (JP); Kenzo Ebihara, Yamanashi (JP)

(73) Assignee: Fanuc Ltd, Minamitsuru-Gun, Yamanashi (JP)

( * ) Notice: Subject to any disclaimer, the term of this patent is extended or adjusted under 35 U.S.C. 154(b) by 234 days.

(21) Appl. No.: 12/361,146

(22) Filed: Jan. 28, 2009

(65) Prior Publication Data
US 2009/0242224 A1 Oct. 1, 2009

(30) Foreign Application Priority Data

Mar. 28, 2008 (JP) ................. 2008-086426

(51) Int. Cl.
*B23D 1/08* (2006.01)
*B23D 7/10* (2006.01)
*B23Q 5/28* (2006.01)
*H02K 33/00* (2006.01)

(52) U.S. Cl. ......... 409/327; 409/326; 409/304; 409/343; 409/338; 310/17; 310/12.31

(58) Field of Classification Search .......... 409/304, 409/326, 327, 337, 338, 343, 183, 184, 185, 409/204, 206, 210, 214, 218, 235, 336; 82/1.2, 82/1.4, 904; 408/129, 234, 700; 310/12.01, 310/12.31, 15, 17, 90.5, 92, 103, 51, 152, 310/77; 335/209, 285, 302
See application file for complete search history.

(56) References Cited

U.S. PATENT DOCUMENTS

| 5,718,154 | A | * | 2/1998 | Council, Jr. .................. 82/1.11 |
| 6,798,088 | B2 | * | 9/2004 | Hsu et al. ..................... 409/235 |
| 7,492,066 | B2 | * | 2/2009 | Kawai et al. .................. 310/15 |
| 2007/0103262 | A1 | | 5/2007 | Kawai et al. |
| 2009/0003946 | A1 | * | 1/2009 | Chen ............................ 408/111 |
| 2009/0229439 | A1 | * | 9/2009 | Hamura et al. ................ 83/875 |
| 2010/0045118 | A1 | * | 2/2010 | Hamura et al. ................ 310/17 |

FOREIGN PATENT DOCUMENTS

| JP | 2065940 A | | 3/1990 |
| JP | 6081926 A | | 3/1994 |
| JP | 07-137935 A | * | 5/1995 |
| JP | 11114761 A | | 4/1999 |
| JP | 2004-122285 A | * | 4/2004 |
| JP | 2005-268335 A | * | 9/2005 |
| JP | 2007-130712 A | | 5/2007 |

OTHER PUBLICATIONS

Notice of Reasons for Rejection for JP2008-086423 mailed Mar. 31, 2009.

* cited by examiner

*Primary Examiner* — Erica E Cadugan
(74) *Attorney, Agent, or Firm* — Lowe Hauptman Ham & Berner LLP

(57) ABSTRACT

When a slide member mounted with a tool reciprocates on a guide member reach one end and the other end positions of the guide member, permanent magnets provided on the guide member and the permanent magnets provided on the slide member repel each other to give the guide member forces for reversing its moving direction. The guide member is provided to be movable with respect to a base and repulsive forces between permanent magnets provided on the base and permanent magnets provided on the guide member are used to retain an axial position of the guide member.

24 Claims, 4 Drawing Sheets

MACHINING APPARATUS WITH MECHANISM FOR RETAINING AXIAL POSITION OF GUIDE MEMBER

RELATED APPLICATIONS

The present application is based on, and claims priority from, Japanese Application Number 2008-086426, filed Mar. 28, 2008, the disclosure of which is hereby incorporated by reference herein in its entirety.

BACKGROUND OF THE INVENTION

1. Field of the Invention

The present invention relates to a machining apparatus for carrying out grooving by reciprocating a slide member mounted with a tool at high speed and particularly to a machining apparatus having a mechanism for retaining an axial position of a guide member for guiding the slide member.

2. Description of the Related Art

In a metal mold for molding a diffraction grating or a light guide plate used in a liquid crystal display, hundreds to tens of thousands of grooves need be formed. To form such a large number of grooves in a shorter machining time, a machining apparatus having a high-speed feed shaft is necessary. A linear shaft used in a normal machine tool has large sliding weight and is not suitable for high-speed driving.

As a feed mechanism for achieving high-speed and high-precision machining, there is a known structure combining an air bearing and a linear motor. As a feed shaft of this structure, there is a technique of a machining apparatus for forming fine grooves by reciprocating a slide member (shuttle) mounted with a tool at high speed as disclosed in Japanese Patent Application Laid-open No. 2007-130712 (corresponding to U.S. Patent Publication No. 2007/0103262). A slide member high-speed reciprocating device used in this machining apparatus has a mechanism for reversing the slide member by utilizing repulsive forces between magnets disposed at the slide member and magnets disposed at a guide member for guiding the slide member at stroke ends of the slide member to thereby cancel out reaction in the reversal of the slide member.

The high-speed reciprocating device in the machining apparatus described in the aforementioned patent document carries out only one-way pull cutting. For example, if the pull cutting is carried out only on a forward path of the reciprocation, the slide member mounted with the tool receives machining reaction force only on the forward path. Therefore, an acceleration in a decelerating direction is produced for the slide member to slow down the slide member. On the other hand, because cutting is not carried out on a return path, the slide member does not receive the machining reaction force and is not slowed down by the acceleration in the decelerating direction.

Consequently, the reaction force transmitted to the guide member when the slide member is reversed by the force of the magnets at the stroke end of the reciprocating device is greater in reversal from the return path (at high speed as described above) to the forward path than in reversal from the forward path (at low speed as described above) to the return path.

As a result, the reaction force at one end of the stroke of reciprocation of the slide member is different from that at the other end of the stroke and therefore the guide is moved in a direction in which the machining reaction force is transmitted to the tool. In other words, the machining reaction force is transmitted to the guide through the slide member mounted with the tool. Therefore, a mechanism for supporting the guide member in an axial direction is necessary.

Since the machining apparatus disclosed in the aforementioned patent document does not have a mechanism for resisting the machining reaction force applied to the tool, it is difficult to carry out machining such as heavy cutting and cutting of high-hardness material with heavy cutting loads.

Moreover, the aforementioned reciprocating device employs a hydrostatic oil bearing or a hydrostatic air bearing as a fluid bearing. The hydrostatic oil bearing is not suitable for high-speed driving because of high viscous resistance. Although the hydrostatic air bearing is suitable for high-speed driving but not suitable for machining with a heavy cutting load because of low bearing rigidity.

SUMMARY OF THE INVENTION

Therefore, objects of the present invention are to solve the above-described problems and to provide a machining apparatus including a reciprocating device capable of machining a workpiece even if a cutting load is heavy and machining reaction force is large.

To achieve the above object, according to the present invention, there is provided a machining apparatus which includes a base, a guide member supported to be movable with respect to the base, a slide member which is adapted to mount a tool and moves in the same direction as a moving direction of the guide member while guided on the guide member, and a thrust generating mechanism for generating a thrust for moving the slide member with respect to the guide member. Further, permanent magnets for reversing a moving direction of the slide member are disposed on the slide member and the guide member, respectively, so that a repulsive force in the moving direction of the guide member acts between the slide member and the guide member at each end position of a movement stroke of the slide member. Furthermore, the base and the guide member are provided with a retaining mechanism for retaining an axial position of the guide member with respect to the base.

The retaining mechanism may be configured such that retaining forces for retaining an axial position of the guide member act between the guide member and the base, and the retaining forces are balanced in a vicinity of a center of a stroke of the guide member with respect to the base, and the retaining force for returning the guide member to the central position of the stroke is applied when the guide member is displaced from the vicinity of the center of the stroke.

The retaining mechanism may be formed of permanent magnets disposed on the base and permanent magnets disposed on the guide member and repulsive forces between the permanent magnets are used as the retaining forces for retaining the axial position of the guide member without contact.

The permanent magnets for reversing the moving direction of the slide member may be used as the permanent magnets forming the retaining mechanism and are disposed on the guide member.

The machining apparatus may comprise further a linear motor including driving permanent magnets disposed in positions of the guide member and corresponding to the opposite ends of the movement stroke of the slide member, respectively, and an iron core disposed between the driving permanent magnets, wherein the linear motor is used as the thrust generating mechanism, and further, the driving permanent magnets may be used as the permanent magnets disposed on the guide member and forming the retaining mechanism.

The permanent magnets disposed on the base and forming the retaining mechanism may be mounted to distance adjusting mechanisms for adjusting distances away from the permanent magnets disposed on the guide member and forming the retaining mechanism.

The guide member may be supported to be movable with respect to the base with rolling bearings interposed therebetween.

The slide member may be supported to be movable with respect to the guide member with rolling bearings interposed therebetween.

The guide member may be supported to be movable with respect to the base with rolling bearings interposed therebetween while the slide member is supported to be movable with respect to the guide member with fluid bearings interposed therebetween.

Since the machining apparatus according to the present invention has the above-described structure, it is possible to provide a machining apparatus including the reciprocating device capable of machining a workpiece even if a cutting load is heavy and machining reaction force is large.

BRIEF DESCRIPTION OF THE DRAWINGS

Above and other objects and features of the present invention will become apparent from the following description of an embodiment with reference to the accompanying drawings, wherein.

DETAILED DESCRIPTION OF THE PREFERRED EMBODIMENT

Figure 1:
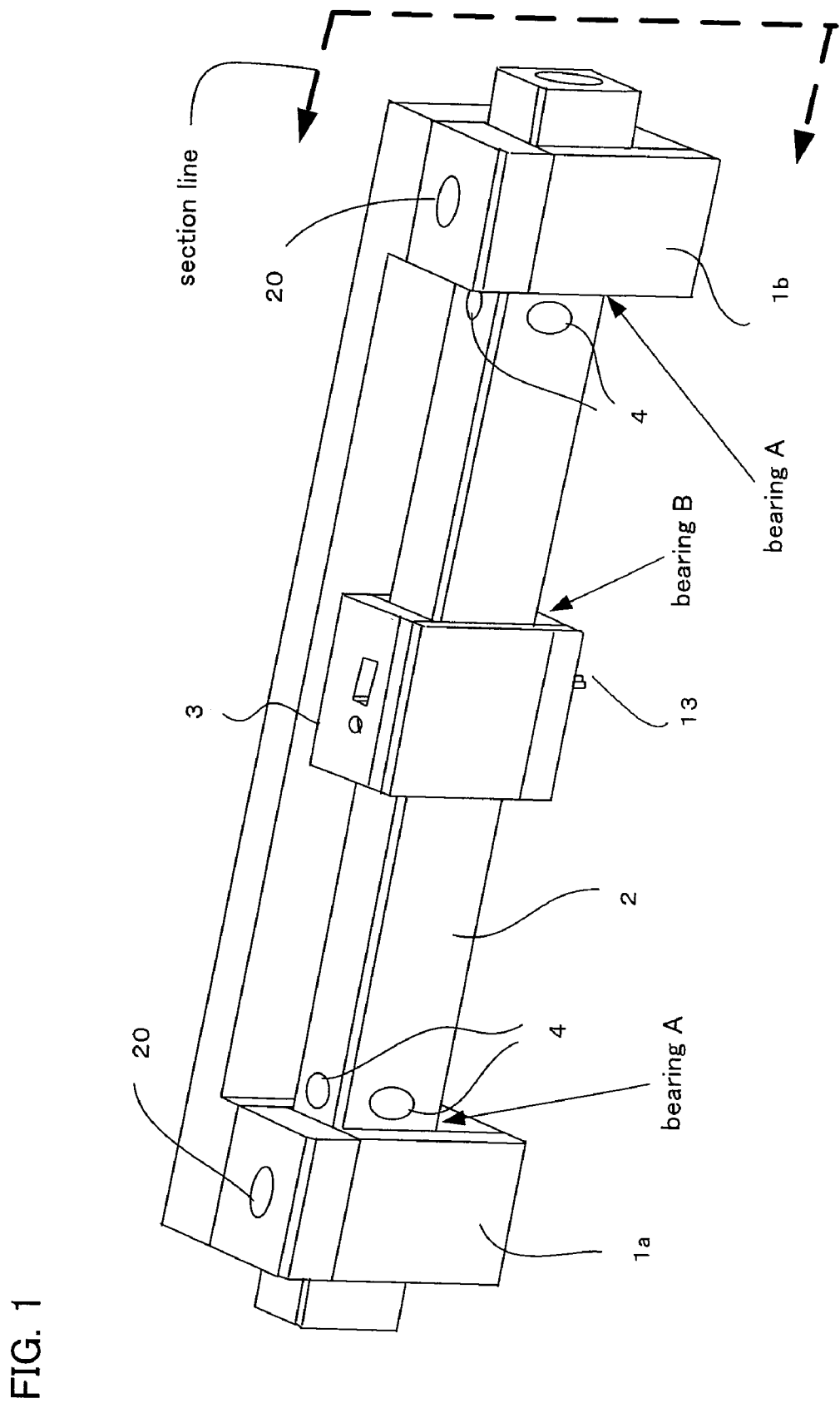
FIG. 1 is a perspective view of an essential portion of one embodiment of a machining apparatus according to the present invention.
Figure 2:
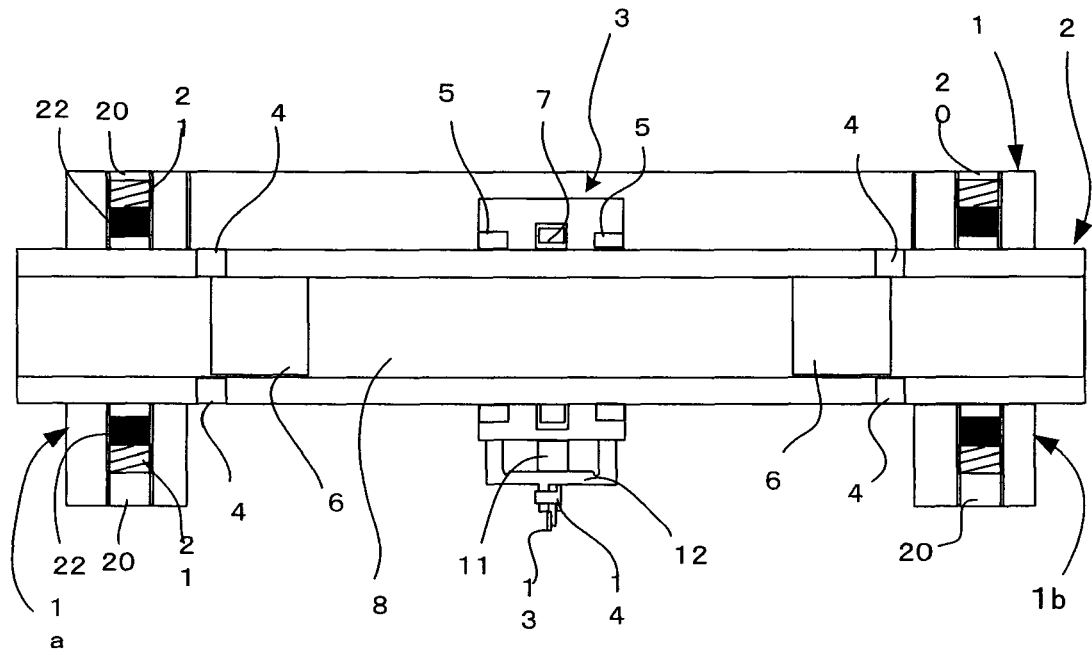
FIG. 2 is a sectional view of the machining apparatus in FIG. 1, taken along "section line"

First, an overview of one embodiment of the machining apparatus according to the present invention will be provided by using FIGS. 1 and 2.

A base 1 of the machining apparatus is fixed to an installation position of the machining apparatus. The base 1 includes a first base portion 1a for supporting one end portion of a guide member 2 with a bearing A and a second base portion 1b for supporting the other end portion of the guide member 2 with a bearing A. Each of the first and second base portions 1a, 1b is provided with two guide retaining screw holes 20 as described later.

The guide member 2 supports a slide member 3 with a bearing B so that the slide member 3 can move in an axial direction of the guide member 2. The slide member 3 and the guide member 2 can move coaxially. Inside the slide member 3, a coil and reversing permanent magnets forming a linear motor (described later) are mounted. As the guide bearings A and the slide bearing B, fluid bearings or rolling bearings may be used.

At the guide member 2, as shown in FIG. 2, driving permanent magnets 6 are disposed respectively in positions corresponding to one end portion and the other end portion of a stroke of reciprocation of the slide member 3 with respect to the guide member 2. An iron core is disposed between the permanent magnet 6 and the permanent magnet 6 to form the linear motor. Furthermore, reversing permanent magnets 4 are disposed in positions of the guide member 2 and corresponding to stroke opposite end portions of the reciprocation of the slide member 3. In the example in FIG. 2, the reversing permanent magnets 4 are disposed in positions outside the above-described driving permanent magnets 6.

The reversing permanent magnets 4 are disposed so that orientations of their magnetic poles are perpendicular to the axial direction of the guide member 2 (a direction of the reciprocation of the slide member 3). The driving permanent magnets 6 are disposed to strengthen magnetic forces of the reversing permanent magnets 4.

The guide member 2 has a substantially square or rectangular cross-section in a direction perpendicular to its axial direction and has four guide surfaces as shown in FIG. 1. The one reversing permanent magnet 4 is disposed in a position of each of the four guide surfaces and corresponding to the one end or the other end of the stroke of the slide member 3. In other words, the four permanent magnets 4 are disposed in the position of the guide member 2 corresponding to the one end or the other end of the stroke of the slide member 3 so that orientations of their magnetic poles are perpendicular to the axial direction of the guide member 2 (i.e., perpendicular to a sliding direction of the slide member 3).

As shown in FIG. 2, the base 1 is formed with the guide retaining screw holes 20 as internal threads in two positions of each of the first base portion 1a and the second base portion 1b (four positions in total) supporting the one end portion and the other end portion of the guide member 2. In each of the guide retaining screw holes 20, a short external screw 21 without a head is engaged by screwing. A guide retaining permanent magnet 22 is secured to a lower end of the external screw 21. Therefore, by turning the external screw 21 inside the guide retaining screw hole 20 as the internal thread, it is possible to move the guide retaining permanent magnet 22 secured to a lower end of the external screw 21 up and down in the guide retaining screw hole 20 to thereby adjust a distance from the guide retaining permanent magnet 22 to the guide member 2 (i.e., a distance from the guide retaining permanent magnet 22 to the reversing permanent magnet 4 on the guide member 2 in FIG. 2).

By independently turning the respective external screws 21 at the first base portion 1a and the second base portion 1b of the base 1 to adjust the distances from the guide retaining permanent magnets 22 to the reversing permanent magnets 4 on the guide member 2 (i.e., to adjust repulsive forces between the permanent magnets based on the distances), it is possible to independently set the retaining force of the guide member 2 in the vicinity of the first base portion 1a and the retaining force of the guide member 2 in the vicinity of the second base portion 1b based on the repulsive forces.

The guide retaining permanent magnet 22 is disposed in the guide retaining screw hole 20 so that its magnetic pole generates the repulsive force between a magnetic pole of the reversing permanent magnet 4 on the guide member 2 and itself. The guide member 2 balances in a central position of the base 1 while receiving forces directed to a center of a length of the guide member 2 from the first and second base portions 1a, 1b of the base 1 based on the distances from the guide retaining permanent magnets 22 to the reversing permanent magnets 4.

As described above, because the permanent magnets (the guide retaining permanent magnets 22 and the reversing permanent magnets 4) for retaining the guide member 2 are disposed in bilaterally symmetric positions with respect to the center of the length of the guide member 2 as shown in FIG. 2, the forces applied to the guide member 2 are only in the axial direction of the guide member 2 and do not affect accuracy of straight motion of the guide member 2 with respect to the base 1.

In the example in FIG. 2, the reversing permanent magnets 4 out of the reversing permanent magnets 4 and the driving permanent magnets 6 disposed on the guide member 2 are in positions closer to the guide retaining permanent magnets 22 in the first and second base portions 1a, 1b of the base 1. Therefore, as described above, the guide member 2 is retained by the repulsive forces between the permanent magnets based on the distances between the guide retaining permanent magnets 22 and the reversing permanent magnets 4. Alternatively, if the reversing permanent magnets 4 and the driving permanent magnets 6 are disposed on the guide member 2 so that the driving permanent magnets 6 are in closer positions to the guide retaining permanent magnets 22 in the first and second base portions 1a, 1b of the base 1, the guide member 2 is retained by the repulsive forces between the permanent magnets based on the distances between the guide retaining permanent magnets 22 and the driving permanent magnets 6.

In the example in FIG. 2, if the distances from the guide retaining permanent magnets 22 to the reversing permanent magnets 4 are reduced, the repulsive forces become strong and the forces for retaining the guide member 2 also become strong. However, because the guide member 2 also reciprocates while receiving the reaction force of the reciprocating slide member 3, forces transmitted to the base 1 through the guide retaining permanent magnets 22 in the base portions 1a, 1b of the base 1 also increase. As a result, the structure of the machining apparatus in which the reaction of the slide member 3 is not transmitted to the base 1 becomes insignificant. Therefore, the forces for retaining the guide member 2 based on the distances from the guide retaining permanent magnets 22 to the reversing permanent magnets 4 are preferably the minimum retaining forces after due consideration of reaction force of machining using a tool 13.

Then, since it is possible to adjust the distances between the guide retaining permanent magnets 22 and the permanent magnets on the guide member 2 (the reversing permanent magnets 4 disposed closer to the guide retaining permanent magnets 22 in the example in FIG. 2) independently on the first base portion 1a side and the second base portion 1b side from each other by independently loosening or tightening the external screws 21 engaged by screwing in the guide retaining screw holes 20 in the first and second base portions 1a, 1b, it is possible to adjust the position where the guide member 2 balances. By utilizing this, if an axial direction of the machining apparatus is inclined with respect to a horizontal direction, it is possible to adjust the external screws 21 to thereby bring the guide member 2 to the center.

Figure 3:
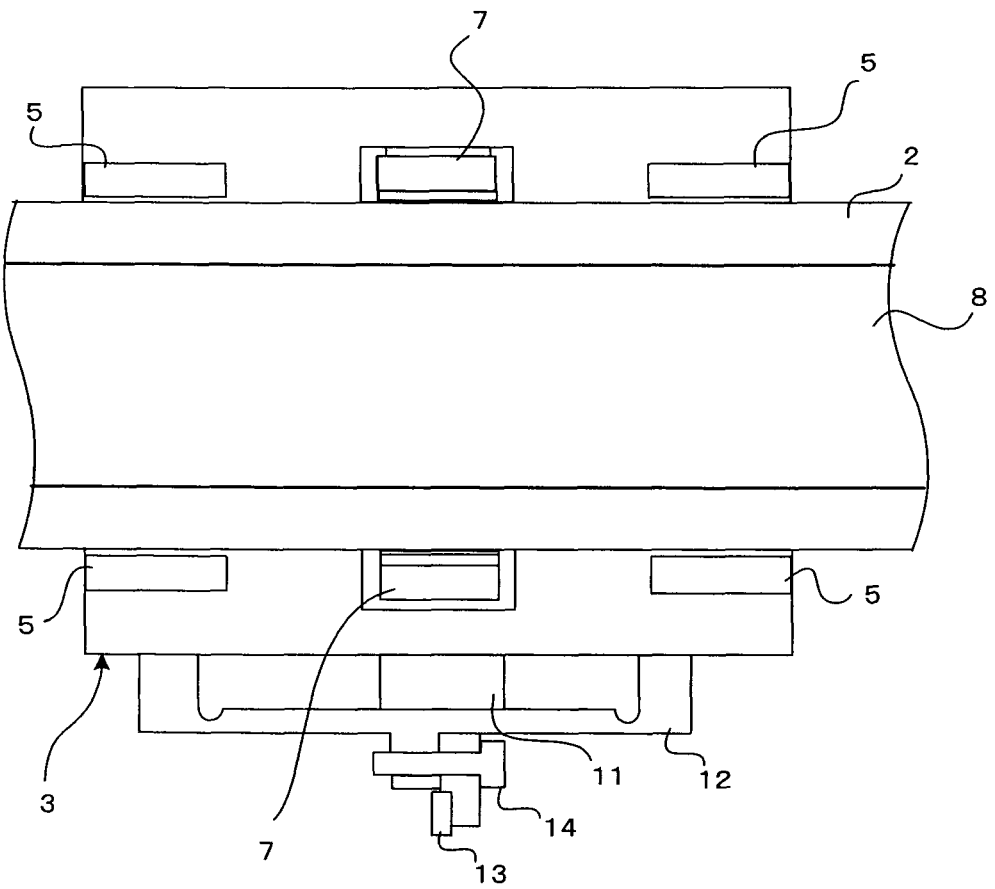
FIG. 3 is a partially enlarged sectional view of a slide member in the machining apparatus shown in FIG. 1.

Next, the specific structure of the slide member 3 will be described by using FIG. 3.

At the longitudinal center of the slide member 3, a coil 7 is disposed to face opposed faces of the guide member 2. At one end portion and the other end portion in a moving direction of the slide member 3, respectively, reversing permanent magnets 5 are disposed to face the opposed faces of the guide member 2 and to have magnetic poles in orientations perpendicular to a reciprocating direction of the slide member 3. The coil 7 and the reversing permanent magnets 5 form a linear motor between the slide member 3 and the guide member 2 as shown in FIG. 3. The reversing permanent magnets 5 thus disposed at the one end portion and the other end portion of the slide member 3 and the reversing permanent magnets 4 disposed on the guide member 2 act on and repel each other.

Furthermore, an elastic member 12 such as a leaf spring is secured to the slide member 3. The tool 13 for grooving a workpiece (not shown) is attached to the elastic member 12 by a tool fixing screw 14. Between the elastic member 12 and a main body of the slide member 3, a piezoelectric element 11 is disposed. The piezoelectric element 11 expands and contracts when it is driven by a controller (not shown). In the machining apparatus according to the embodiment of the present invention, a depth of cut in grooving of the workpiece by the tool 13 is adjusted by protrusion or withdrawal of the tool 13 toward or away from the workpiece according to the expansion or contraction of the piezoelectric element 11 through the elastic member 12 such as the leaf spring.

Figure 4:
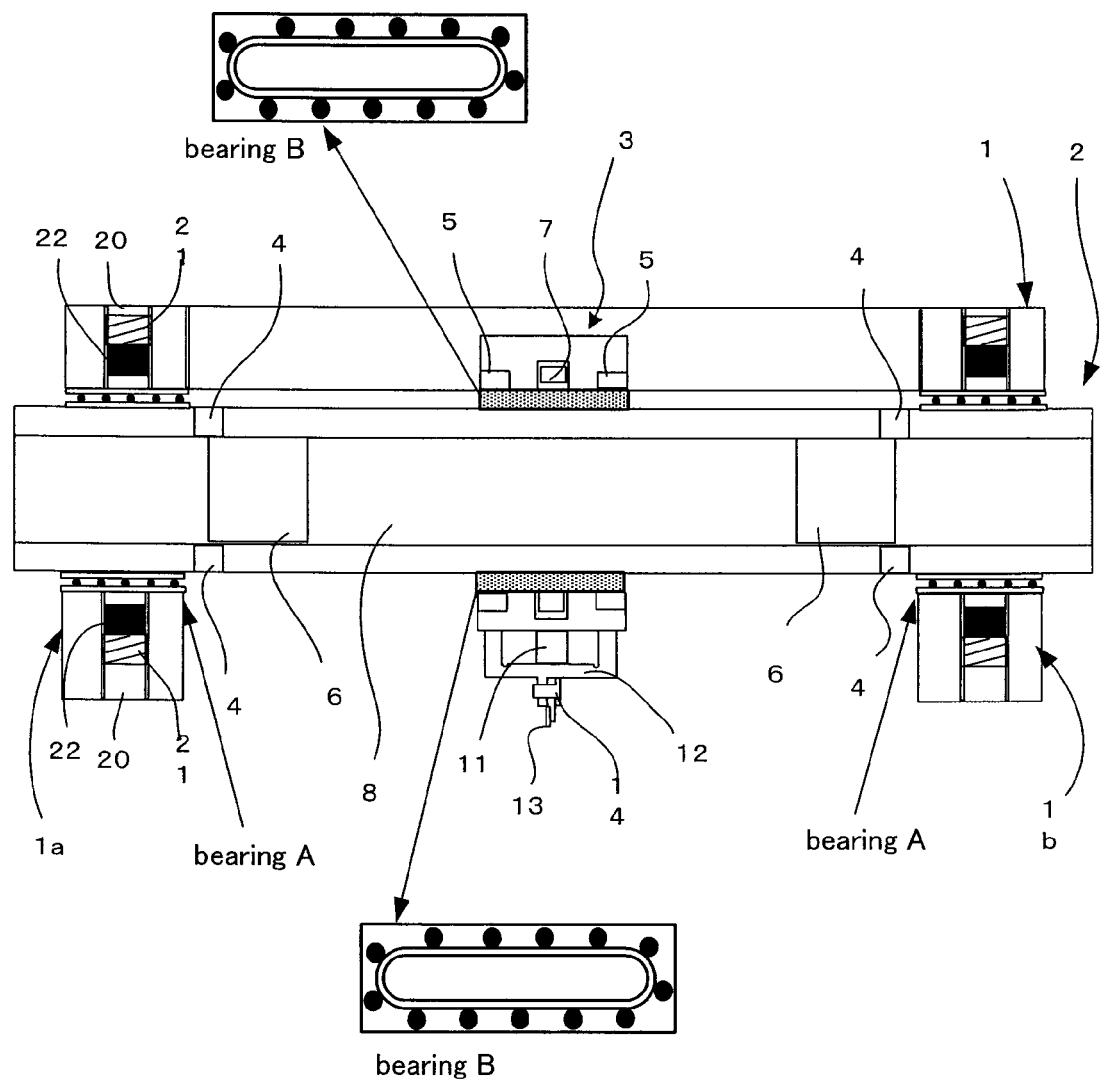
FIG. 4 is a drawing showing an example in which rolling bearings are used as "bearings A" and "bearing B", respectively, in the machining apparatus in FIG. 1.

FIG. 4 shows an example in which rolling bearings are used as the guide bearings A and the slide bearing B in the machining apparatus shown in FIG. 1. FIG. 4 is a sectional view taken along "section line" in FIG. 1.

In the example in FIG. 4, the rolling bearings are used as both of the bearings A between the base 1 and the guide member 2 and the bearing B between the guide member 2 and the slide member 3. As the rolling bearings, ball bearings and roller bearings may be used, for example. Especially for the bearing B, a ball circulating rolling bearing is used as shown in FIG. 4.

In case of machining of hardened steel, cemented carbide (extremely hard material composed mostly of tungsten carbide and cobalt), or hard material such as glass and heavy cutting with a large depth of cut, large cutting reaction forces tend to occur generally. If a fluid bearing such as an air bearing is used when the machining load is heavy as in the above cases, bearing rigidity is low and therefore chattering occurs on a surface of the workpiece to be machined.

Therefore, when the machining load is heavy, a bearing with high bearing rigidity is used to achieve high-precision machining. For this purpose, both the bearings A and bearing B may be the rolling bearings, only the bearings A may be the rolling bearings, or only the bearings B may be the rolling bearings. It is also possible to use fluid bearings in place of the rolling bearings.

According to the one embodiment of the machining apparatus of the present invention, the retaining mechanism for retaining the axial position of the guide member 2 is provided and the rolling bearings for carrying out machining of the workpiece are used for the machining apparatus provided with the retaining mechanism.

Figure 5:
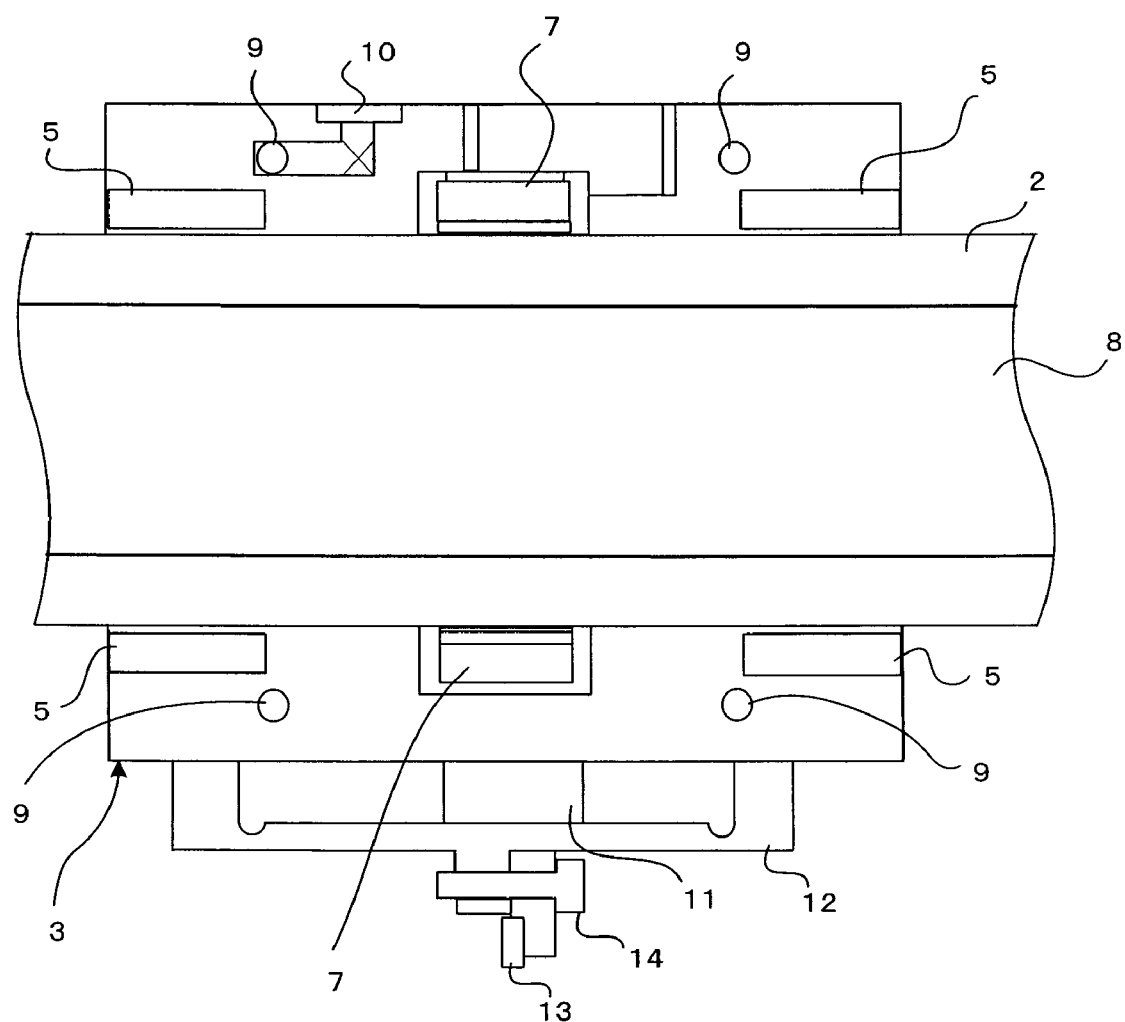
FIG. 5 is a drawing showing an example in which "bearing B" in the machining apparatus in FIG. 1 is an air bearing.

FIG. 5 shows an example in which an air bearing is used as the bearing B for supporting the slide member 3 so that the slide member 3 can move with respect to the guide member 2 in the machining apparatus in FIG. 1.

The slide member 3 is provided with an air inlet 10 and air pipes 9 for communicating with the air inlet 10. As compressed air introduced into the air pipes 9 blows on the opposed faces of the guide member 2, the slide member 3 is supported by air pressure.

In the machining apparatus shown in FIG. 1, air bearings may be used as the bearings A for supporting the guide member 2 so that the guide member 2 can move with respect to the base 1 and the compressed air may blow on the opposed faces of the guide member 2 from the base 1. To employ the air bearings as the bearings for supporting the guide member so that the guide member can move with respect to the base in the machining apparatus is a known technique as disclosed in the above-described Japanese Patent Application Laid-open No. 2007-130712.

Next, the reciprocation of the slide member 3 will be described by using FIGS. 1 to 3.

A current is passed through the coil 7 of the slide member 3 to drive the linear motor formed of the coil 7 and the reversing permanent magnets 5 to move the slide member 3 in one direction. When the slide member 3 reaches a stroke end position of the reciprocation, a direction of the current to be passed through the coil 7 is changed to reverse the moving direction of the slide member 3. In this reversal of the moving direction, distances between the reversing permanent magnets 4 provided to the guide member 2 and the reversing permanent magnets 5 provided to the slide member 3 become short and a repulsive force is generated. As a result, the slide member 3 is rapidly decelerated by the reaction force acting between the reversing permanent magnets 4 and the reversing permanent magnets 5. After receiving the force in a reverse direction, the slide member 3 is rapidly accelerated in the reverse direction.

Because the slide member 3 is accelerated when it receives the repulsive force between the reversing permanent magnets 4 and 5, it is possible to drive the tool 13 to machine the workpiece even with a low-thrust motor formed by disposing the driving permanent magnets 6 in positions of the guide member 2 corresponding to the opposite ends of the stroke of the slide member 3.

Although a stroke of reciprocation of the tool 13 (slide member 3) is limited to a certain stroke, an energy-saving and efficient stroke can be obtained, because the tool 13 is caused to reciprocate by the reversing permanent magnets 4 and 5. With the linear motor in which the driving permanent magnets 6 are disposed at the stroke ends, a thrust ripple and cogging do not occur and it is possible to achieve high-precision linear motion and high-precision linear grooving.

As described above, the direction of the current to be passed through the coil 7 provided to the slide member 3 is changed to thereby reciprocate the slide member 3. The controller for controlling driving of the piezoelectric element 11 during the reciprocation of the slide member 3 passes a predetermined current through the piezoelectric element 11 in a forward movement of the slide member to expand the element 11 to provide a predetermined depth of cut by the tool 13 to carry out pull cutting of the workpiece. In the return movement, the piezoelectric element 11 is contracted to withdraw and return the tool 13 to a position where it does not interfere with the workpiece. Then, by relatively moving the workpiece in the direction perpendicular to the reciprocating direction of the slide member 3 with a means (not shown), the grooving is carried out as described above. The depth of cut of the tool 13 is controlled by a value of the voltage to be applied to the piezoelectric element 11.

What is claimed is:

1. A machining apparatus including a slide member on which a tool is mounted and a guide member for guiding the slide member, wherein a bearing is provided between a fixed base and the guide member, and a bearing is provided between the slide member and the guide member, and wherein the guide member and the slide member are adapted to move coaxially, and a mechanism for generating a thrust between the slide member and the guide member is provided, and wherein permanent magnets for reversing a moving direction of the slide member are disposed on the slide member and the guide member, respectively, so that a repulsive force in the moving direction of the guide member acts between the slide member and the guide member at each end position of a movement stroke of the slide member, wherein permanent magnets for retaining the guide member are disposed on the guide member and the base, respectively, to generate retaining forces for retaining an axial position of the guide member without contact between the guide member and the base, said retaining forces act between the guide member and the base, and the retaining forces are balanced in a vicinity of a center of a stroke of the guide member with respect to the base, and the retaining force for returning the guide member to the central position of the stroke is applied when the guide member is displaced from the vicinity of the center of the stroke.

2. The machining apparatus according to claim 1, wherein, of said permanent magnets for retaining the guide member, some of the permanent magnets for reversing a moving direction of the slide member are used as the permanent magnets disposed on the guide member.

3. The machining apparatus according to claim 2, wherein said mechanism for generating a thrust is a linear motor, and driving magnets used in the linear motor are used for retaining the guide member.

4. The machining apparatus according to claim 3, wherein some of said permanent magnets for retaining the guide member are mounted to distance adjusting mechanisms for adjusting distances between the permanent magnet on the side of the guide member and the permanent magnet on the side the base.

5. The machining apparatus according to claim 4, wherein at least one of the bearing provided between the base and the guide member and the bearing provided between the slide member and the guide member is a rolling bearing.

6. The machining apparatus according to claim 5, wherein said bearing provided between the base and the guide member is a rolling bearing and said bearing provided between the slide member and the guide member is a fluid bearing.

7. The machining apparatus according to claim 3, wherein at least one of the bearing provided between the base and the guide member and the bearing provided between the slide member and the guide member is a rolling bearing.

8. The machining apparatus according to claim 7, wherein said bearing provided between the base and the guide member is a rolling bearing and said bearing provided between the slide member and the guide member is a fluid bearing.

9. The machining apparatus according to claim 2, wherein some of said permanent magnets for retaining the guide member are mounted to distance adjusting mechanisms for adjusting distances between the permanent magnet on the side of the guide member and the permanent magnet on the side the base.

10. The machining apparatus according to claim 9, wherein at least one of the bearing provided between the base and the guide member and the bearing provided between the slide member and the guide member is a rolling bearing.

11. The machining apparatus according to claim 10, wherein said bearing provided between the base and the guide member is a rolling bearing and said bearing provided between the slide member and the guide member is a fluid bearing.

12. The machining apparatus according to claim 2, wherein at least one of the bearing provided between the base and the guide member and the bearing provided between the slide member and the guide member is a rolling bearing.

13. The machining apparatus according to claim 12, wherein said bearing provided between the base and the guide member is a rolling bearing and said bearing provided between the slide member and the guide member is a fluid bearing.

14. The machining apparatus according to claim 1, wherein said mechanism for generating a thrust is a linear motor, and driving magnets used in the linear motor are used for retaining the guide member.

15. The machining apparatus according to claim 14, wherein some of said permanent magnets for retaining the guide member are mounted to distance adjusting mechanisms for adjusting distances between the permanent magnet on the side of the guide member and the permanent magnet on the side the base.

16. The machining apparatus according to claim 15, wherein at least one of the bearing provided between the base and the guide member and the bearing provided between the slide member and the guide member is a rolling bearing.

17. The machining apparatus according to claim 16, wherein said bearing provided between the base and the guide member is a rolling bearing and said bearing provided between the slide member and the guide member is a fluid bearing.

18. The machining apparatus according to claim 14, wherein at least one of the bearing provided between the base and the guide member and the bearing provided between the slide member and the guide member is a rolling bearing.

19. The machining apparatus according to claim 18, wherein said bearing provided between the base and the guide member is a rolling bearing and said bearing provided between the slide member and the guide member is a fluid bearing.

20. The machining apparatus according to claim 1, wherein some of said permanent magnets for retaining the guide member are mounted to distance adjusting mechanisms for adjusting distances between the permanent magnet on the side of the guide member and the permanent magnet on the side the base.

21. The machining apparatus according to claim 20, wherein at least one of the bearing provided between the base and the guide member and the bearing provided between the slide member and the guide member is a rolling bearing.

22. The machining apparatus according to claim 21, wherein said bearing provided between the base and the guide member is a rolling bearing and said bearing provided between the slide member and the guide member is a fluid bearing.

23. The machining apparatus according to claim 1, wherein at least one of the bearing provided between the base and the guide member and the bearing provided between the slide member and the guide member is a rolling bearing.

24. The machining apparatus according to claim 23, wherein said bearing provided between the base and the guide member is a rolling bearing and said bearing provided between the slide member and the guide member is a fluid bearing.

* * * * *